US006995762B1

(12) United States Patent
Pavlidis et al.

(10) Patent No.: US 6,995,762 B1
(45) Date of Patent: Feb. 7, 2006

(54) MEASUREMENT OF DIMENSIONS OF SOLID OBJECTS FROM TWO-DIMENSIONAL IMAGE(S)

(75) Inventors: Theo Pavlidis, Setauket, NY (US); Eugene Joseph, Coram, NY (US); Duanfeng He, South Setauket, NY (US); Edward Hatton, Peterborough (CA); Kefei Lu, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 314 days.

(21) Appl. No.: 10/243,396

(22) Filed: Sep. 13, 2002

Related U.S. Application Data

(60) Provisional application No. 60/318,996, filed on Sep. 13, 2001.

(51) Int. Cl.
G06T 15/00 (2006.01)
(52) U.S. Cl. .................. 345/419; 382/106; 348/46
(58) Field of Classification Search ................ 345/419, 345/418, 619, 617; 382/106; 348/46, 47, 348/140
See application file for complete search history.

(56) References Cited

U.S. PATENT DOCUMENTS

| 5,616,905 | A | * | 4/1997 | Sugiyama | 235/456 |
| 5,949,433 | A | * | 9/1999 | Klotz | 345/634 |
| 6,269,197 | B1 | * | 7/2001 | Wallack | 382/285 |
| 6,336,587 | B1 | | 1/2002 | He et al. | 235/462.22 |
| 6,377,865 | B1 | * | 4/2002 | Edelsbrunner et al. | 700/98 |
| 6,453,069 | B1 | * | 9/2002 | Matsugu et al. | 382/173 |
| 6,483,950 | B1 | * | 11/2002 | Wallack | 382/285 |
| 6,541,747 | B1 | * | 4/2003 | Kikuchi et al. | 250/201.2 |
| 6,546,118 | B1 | * | 4/2003 | Iisaka et al. | 382/104 |
| 6,621,924 | B1 | * | 9/2003 | Ogino et al. | 382/165 |
| 6,697,147 | B2 | * | 2/2004 | Ko et al. | 356/4.03 |
| 6,760,038 | B2 | * | 7/2004 | Venkataraman et al. | 345/620 |
| 6,847,392 | B1 | * | 1/2005 | House | 348/36 |

OTHER PUBLICATIONS

Lee et al, A Computer Vision System for Generaqting Object Description, IEEE, Pattern recognition and Image Processing, Jun. 1982, pp. 466-472.*
Davies, Machine Vision, Theory Algorithms and Practicalities, Academic Press, Jun. 1997, pp. 103-117, 131-163, 309-343.*

* cited by examiner

Primary Examiner—Phu K. Nguyen
(74) Attorney, Agent, or Firm—Amin & Turocy, LLP

(57) ABSTRACT

The present invention facilitates solid object reconstruction from a two-dimensional image. If an object is of known and regular shape, information about the object can be extracted from at least one view by utilizing appropriate constraints and measuring a distance between a camera and the object and/or by estimating a scale factor between a camera image and a real world image. The same device can perform both the image capture and the distance measurement or the scaling factor estimation. The following processes can be performed for object identification: parameter estimation; image enhancement; detection of line segments; aggregation of short line segments into segments; detection of proximity clusters of segments; estimation of a convex hull of at least one cluster; derivation of an object outline from the convex hull; combination of the object outline, shape constraints, and distance value.

33 Claims, 13 Drawing Sheets corners vectors

MEASUREMENT OF DIMENSIONS OF SOLID OBJECTS FROM TWO-DIMENSIONAL IMAGE(S)

CROSS REFERENCE TO RELATED APPLICATIONS

This application claims the benefit of co-pending provisional application Ser. No. 60/318,996 which was filed on Sep. 13, 2001 and entitled MEASUREMENT OF DIMENSIONS OF SOLID OBJECTS FROM A SINGLE IMAGE; the entirety of which is incorporated herein by reference.

TECHNICAL FIELD

The present invention generally relates to solid object reconstruction. In particular, the present invention relates to systems and methods for measurements of dimensions of solid objects from two-dimensional image(s).

BACKGROUND OF THE INVENTION

Image-based object reconstruction is the process of estimating shape, volume, and surface reflectance properties on an object from its images. Reconstruction of three-dimensional objects in a scene from multiple two-dimensional images of the scene has been the subject of research since the late 19th century. Reconstruction has also recently become particularly important in, for example, computer vision and robotics. The geometric relation between three-dimensional objects and the images created by a simple image recorder such as a pinhole camera (e.g., a camera without a lens) is a source of information to facilitate a three-dimensional reconstruction. Current practical commercial systems for object reconstruction generally rely on reconstruction from aerial photographs or from satellite images. In both cases, cameras are used which record images from two locations, whose positions relative to a scene are precisely determinable. In reconstruction from aerial photographs, two cameras are mounted with precise spacing and orientation on a common airborne platform, which ensures that the geometries of the cameras relative to each other are fixed in a known condition. With satellites, the positions and orientations of the satellites can be determined with great accuracy, thereby providing the geometrical information required for reconstruction with corresponding precision. In any case, reconstruction of the desired objects shown in the images can be performed from two-dimensional photographic or video images taken from such an arrangement.

Generally, reconstruction methods are non-linear and do not behave well in the presence of errors in measurement of the various camera calibration parameters and in the images from which the objects are to be reconstructed. Conventional reconstruction methods typically rely on successful decoupling of two sets of parameters known as intrinsic and extrinsic parameters. Extrinsic parameters are related to an external geometry or arrangement of the cameras, including rotation and translation between a coordinate frame of one camera in relation to a coordinate frame of a second camera. Intrinsic parameters associated with each camera is related to the camera's internal geometry in a manner that describes a transformation between a virtual camera coordinate system and a true relationship between the camera's image plane and its center of projection (COP). The intrinsic parameters can be represented by the image's aspect ratio, the skew and the location of the principal point, that is, the location of the intersection of the camera's optical axis and the image plane.

These intrinsic and extrinsic parameters are coupled together and it is possible to recover a Euclidean three-dimensional structure of a scene depicted in two views only if these two sets of parameters can be decoupled. The precise manner in which the intrinsic and extrinsic parameters are coupled together is as follows. If the intrinsic parameters for the cameras are used to form respective three-by-three matrices M and M', and R and "t" represent the rotational and translational external parameters, then for points p=(x, y,1)$^T$ and p'=(x',y',1)$^T$ ("T" represents the matrix transpose operation) representing the projection in the two images of a single point P in the scene, $$z'p'=zM'RM^{-1} p-M't \quad (1)$$

where z and z' represent respective depth values for point P relative to the two camera locations.

There are several general methods for reconstruction. In one set of methods, the values of the various parameters in equation (1) are determined. In one such method the values of the internal parameters are determined by a separate and independent "internal camera calibration" procedure that relies on images of specialized patterns. In a second such method, more than two views of a scene are recorded and processed and the two sets of parameters are decoupled by assuming that the internal camera parameters are fixed for all views. One significant problem with the first approach (using a separate internal camera calibration step) is that even small errors in calibration lead to significant errors in reconstruction. The methods for recovering the extrinsic parameters following the internal calibration are known to be extremely sensitive to minor errors in image measurements and require a relatively large field of view in order to behave properly. In the second approach (using more than two views of a scene) the processing techniques are iterative based on an initial approximation, and are quite sensitive to that initial approximation.

Another set of methods does not require determining the values of the various parameters in equation (1). Instead, reconstruction is performed from an examination of various features of the scene which are present in images of the scene that are recorded from a plurality of diverse locations. All of these methods require that corresponding points and/or lines, that is, points and/or lines in the views which are projections of the same points and/or lines in the scene, be located in all of the three views. In some applications, locating corresponding points and/or lines in the three views can be difficult or impossible.

When the relative dimensions of the object are determined from the image, the conventional processes require an extra measurement to obtain the actual physical dimensions. The extra measurement can be performed utilizing a ruler positioned on the object, or through range measurement of the object from the camera. Ranging can be performed by utilizing stereovision, an ultrasonic sensor, a calibrated focusing mechanism or a defocus measurement from images. However, stereovision and ultrasonic sensor techniques present the high system cost; the calibrated focusing mechanism requires an adjustable focus system which may not be available on all imaging systems and a relatively fast optical system; and the defocus measurement also requires a relatively fast optical system, as well as, two images taken with different optical parameters.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides systems and methods for solid object reconstruction from a two-dimensional image. If an object is of known and regular shape, information about the object can be extracted from at least one view by utilizing appropriate constraints and measuring a distance between a camera and the object and/or by estimating a scale factor between a camera image and a real world image. The same device can perform both the image capture and the distance measurement or the scaling factor estimation. The captured image can be compressed and transmitted (e.g., wirelessly) to another device for processing. Alternatively, the results obtained after a process can be compressed and transmitted for further processing.

A system for generating a three-dimensional object from at least one two-dimensional view is provided. The system includes an image capture component that receives a 2-D image, a data store employed to store image related data. An image analyzer analyzes the captured image—the image analyzer includes a distance analyzer and scaling component which are employed in connection with generating data for the object construction. An object construction component receives the analyzed data and generates a 3-D object relating to the captured 2-D representation as discussed in greater detail below. A processing component receives the 3-D object, which may be in the form of a mathematical representation (e.g., database, vector representation, . . . ), and employs the 3-D object in connection with any of a variety of predetermined uses relating to the captured 2-D image.

The following processes can be performed for object identification: parameter estimation; image enhancement; detection of line segments; aggregation of short line segments into segments; detection of proximity clusters of segments; estimation of a convex hull of at least one cluster; derivation of an object outline from the convex hull; combination of the object outline, shape constraints, and distance value to obtain actual dimensions; three-dimensional model formation; and estimation of a scale factor between a camera image and an object.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
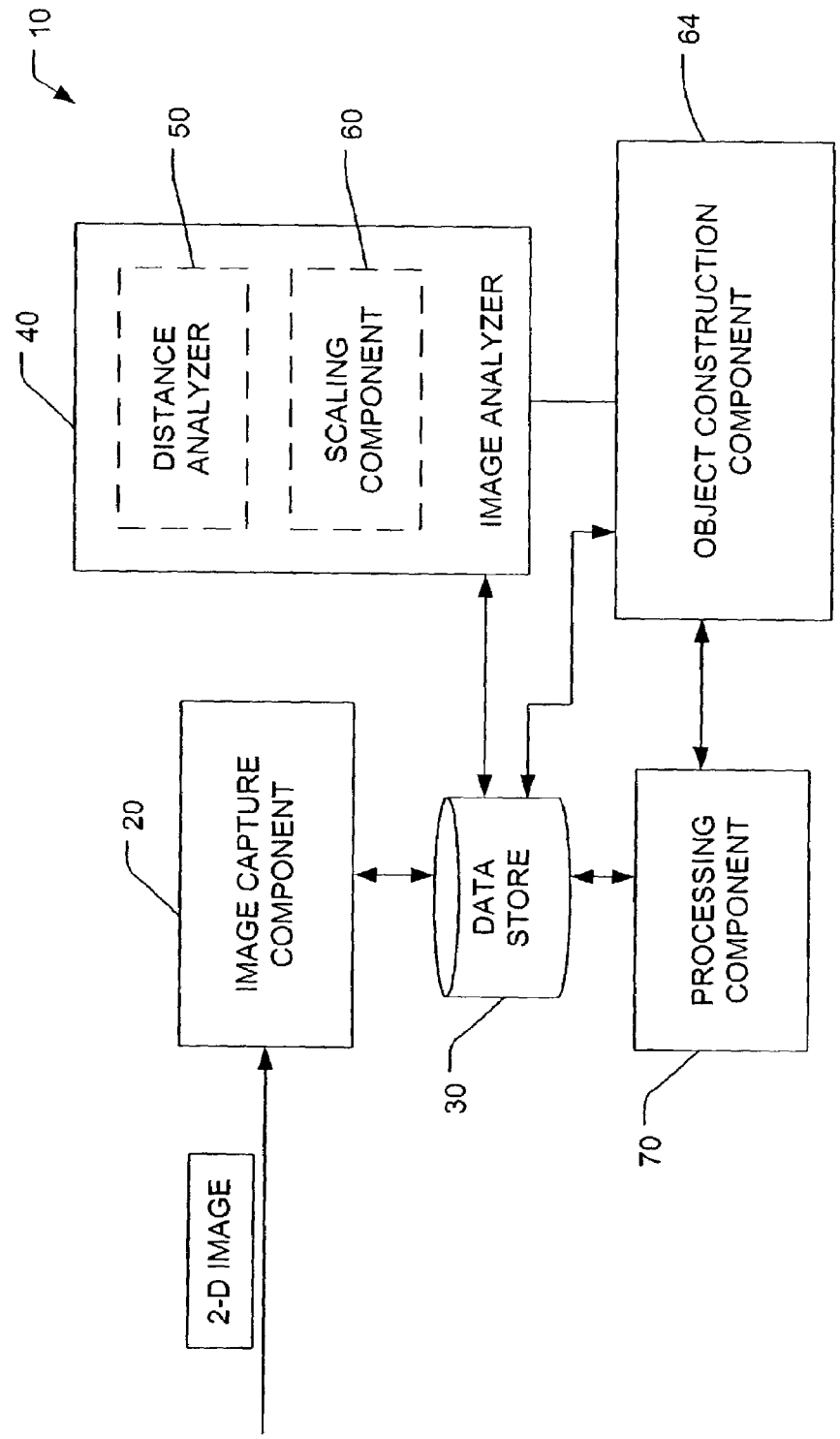
FIG. 1 illustrates an input image employed for solid object reconstruction in accordance with an aspect of the present invention.

The present invention relates to systems and methods for solid object reconstruction. The present invention will now be described with reference to the drawings, wherein like reference numerals are used to refer to like elements throughout. It is to be appreciated that the various drawings are not drawn to scale from one figure to another nor inside a given figure, and in particular that the size of the components are arbitrarily drawn for facilitating the reading of the drawings. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

As used in this application, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and/or thread of execution and a component may be localized on one computer and/or distributed between two or more computers.

Object reconstruction can be performed by employing a process which is independent of a shape of the object. The process includes: parameter estimation; image enhancement; detection of line segments; aggregation of short line segments into longer segments; detection of proximity clusters of segments; and estimation of the convex hull of one or more clusters. Further, if object recognition is employed for rectangular boxes, the process further comprises: derivation of the object outline from the convex hull; and combination of the object outline, shape constraints, and distance value to obtain the actual dimensions. Three-dimensional model formation; and estimation of a scale factor between a camera image and an object can also be employed.

FIG. 1 is a high-level system diagram of an image processing system 10 in accordance with the subject invention. The system 10 provides for receiving a two-dimensional image and generating a three-dimensional object representation. The subject system 10 can perform such 3-D object representation via 2-D view(s). The generated 3-D object representation can be employed in a variety of manners (e.g., sizing, dimensioning, scaling . . . ). The system 10 can be embodied in a variety of computing devices (e.g., cameras, personal computers, portable computing devices, cellular phones, inventory monitoring devices, networked computing systems . . . ). The system 10 includes an image capture component 20 that receives a 2-D image. A data store 30 is part of the system and can be employed to store image related data. An image analyzer 40 analyzes the captured image—the image analyzer includes a distance analyzer 50 and scaling component 50 which are employed in connection with generating data for the object construction. Details regarding distance analysis (e.g., camera distance from 2-D image) and image scaling are discussed in substantial detail infra. An object construction component 70 receives the analyzed data and generates a 3-D object relating to the captured 2-D representation as discussed in greater detail below. A processing component 80 receives the 3-D object, which may be in the form of a mathematical representation (e.g., database, vector representation, . . . ), and employs the 3-D object in connection with any of a variety of predetermined uses relating to the captured 2-D image.

Figure 2:
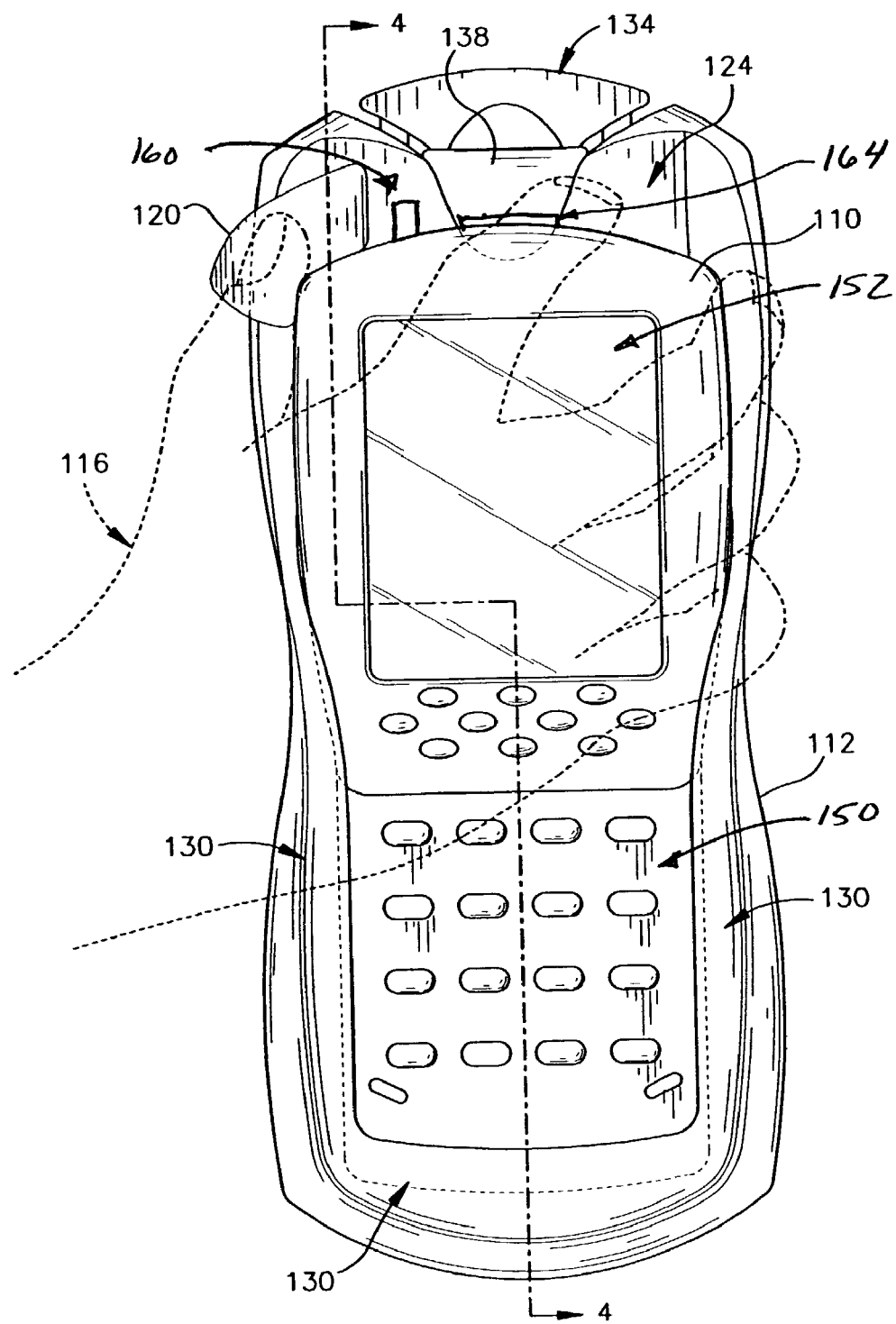
FIG. 2 illustrates detected line processing stage of the input image in accordance with an aspect of the present invention.

FIG. 2 illustrates a hand held computing device 110 (also referred to as the device) and vehicle cradle 112 (also referred to as the cradle) in accordance with one particular aspect of the present invention. As noted above, the subject system 10 can be employed in connection with a variety of computing systems and/or devices. The subject hand held system 110 is discussed solely to provide some context for one specific implementation of the subject system 10. For illustrative purposes, a hand 116 is depicted in a position of placing the hand held device 110 into the vehicle cradle via depression of a latch 120.

The vehicle cradle includes a base portion 124 that can be contoured in a shape similar to the hand held device 110, thereby facilitating insertion and removal of the device 110 into and from the cradle 112. The base portion 124 restricts movement of the device in a Z− direction (direction from device toward the base), and overlapping portions 130 affixed to the base portion 124 are included to help restrict device movements in the Y−, Z+, X+, and X− directions. The overlapping portions 130 in conjunction with the base 124 operate as a cradle, or receiver, to hold and store the device 110. A second latch 134 can be employed to provide single-handed storage and release of an auxiliary component, such as a battery 138.

As noted above, the device 110 is securely held in the vehicle cradle 112 during substantial shocks and vibrations. The vehicle cradle 112 and associated latches and compartments can be constructed from various materials. It is noted, however, that the materials should be substantially resistant to damage from shock and vibration that can be encountered during road travels.

The computing device 110 includes a key pad 150 that facilitates entry of data by a user. The device 110 also includes a display 152 as is conventional. An antenna 160 facilitates wireless communications by the device 110. An image capture system 164 (e.g., camera, scanner, laser . . . ) facilitates the computing device capturing images in connection with the present invention. The computing device 110 in addition to the system 10 discussed supra includes typical computing components associated with like systems and/or devices and further discussion thereto is omitted for sake of brevity.

Figure 3:
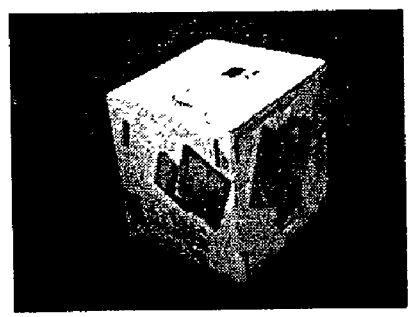
FIG. 3 illustrates an input image employed for solid object reconstruction in accordance with an aspect of the present invention.
Figure 4:
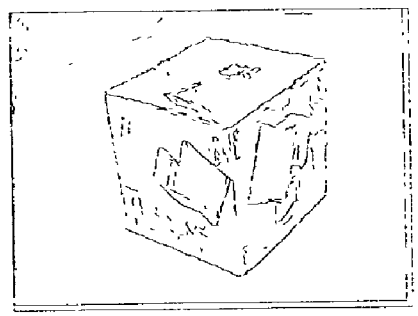
FIG. 4 illustrates detected line processing stage of the input image in accordance with an aspect of the present invention.
Figure 5:
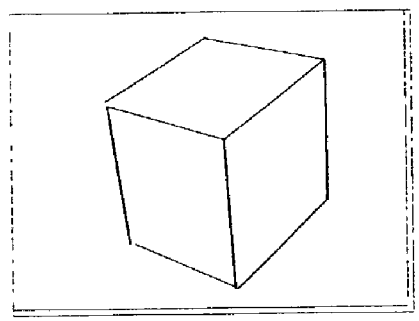
FIG. 5 illustrates a final outline of the reconstructed image in accordance with an aspect of the present invention.

FIGS. 3 through 5 illustrate an overview of the processing. FIG. 3 depicts an input image. The input image can be employed for image enhancement and detection of line segments. FIG. 4 depicts the lines detected during processing. FIG. 5 depicts a final outline of the object as reconstructed by processed described herein.

Figure 6:
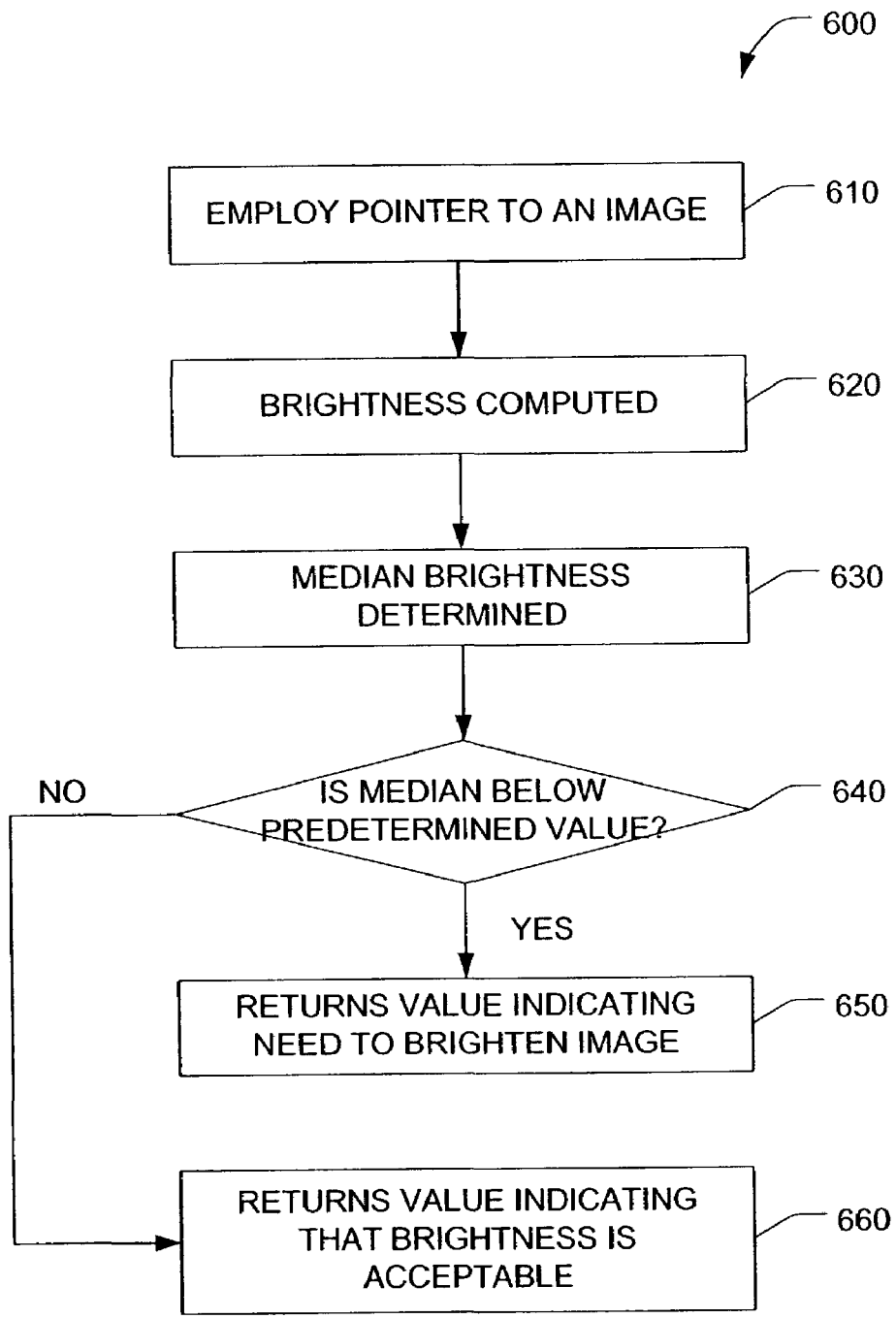
FIG. 6 illustrates a methodology for estimating a brightness parameter in accordance with an aspect of the present invention.
Figure 7:
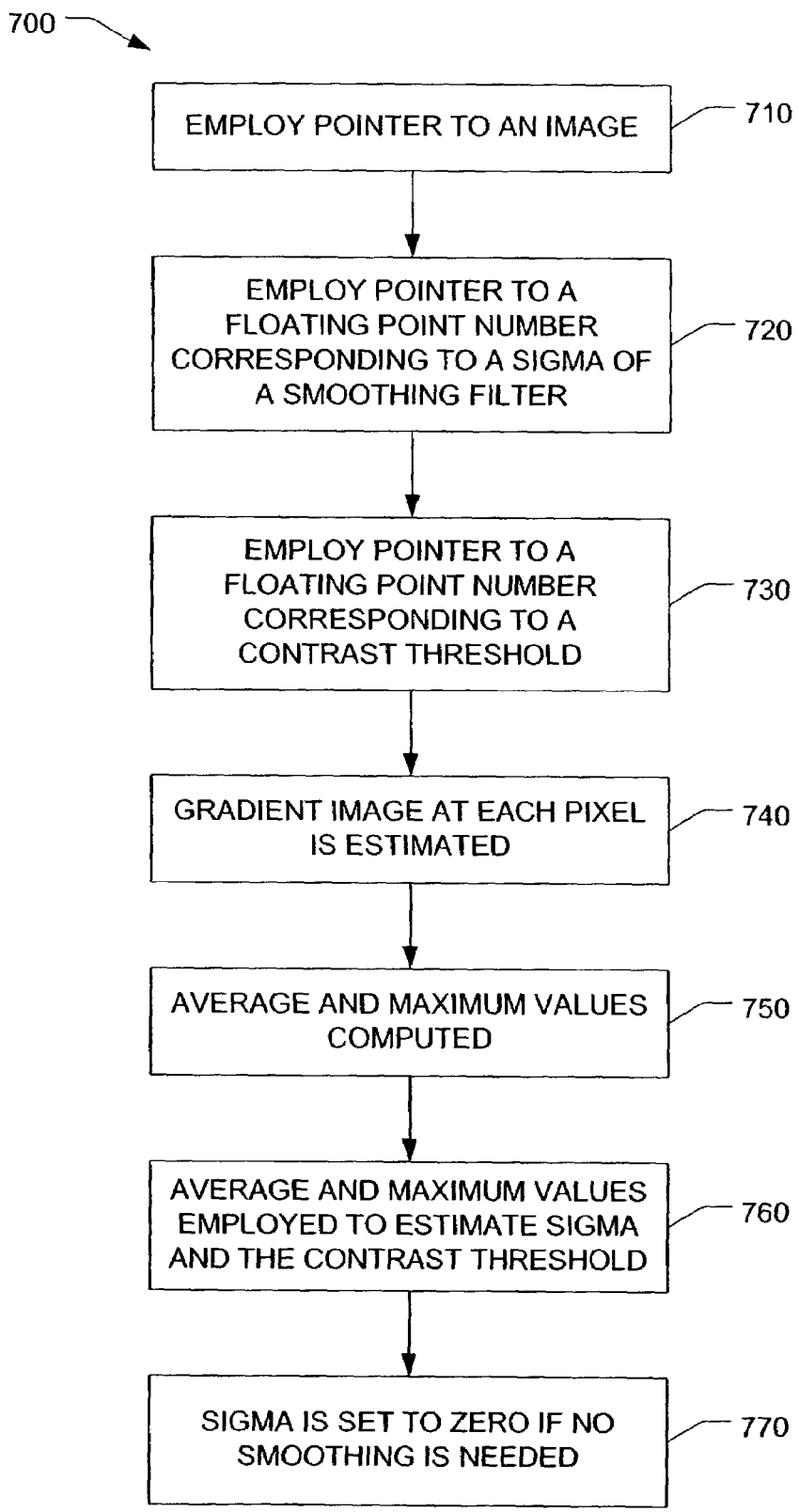
FIG. 7 illustrates a methodology for estimating a contrast parameter in accordance with an aspect of the present invention.

FIGS. 6 and 7 illustrate methodologies of parameter estimation. Parameters are employed for smoothing out noise (e.g., graininess), enhancing contrast, separating different types of line segments, etc. The parameters can be estimated automatically. FIG. 6 depicts a methodology 600 for estimating a brightness parameter. The methodology begins at 610 where it employs as argument a pointer to an image. At 620, the brightness of the image is computed. For example, an image processing circuit is coupled to a camera and is adapted to compute maximum values of brightness levels of the raw color image signals provided by charge coupled devices (CCDs) in the camera. Then, at 630, a brightness histogram is computed. The brightness histogram can be computed via a computation circuit, which computes frequencies of brightness levels to create a histogram of the image signals. From the histogram, a median brightness is determined. At 640, it is determined whether the median brightness is below a predetermined value. For example the predetermined value can be 64. If the median brightness is below the predetermined value (YES), at 650, the methodology returns a value indicating a need to brighten the image. However, if the median brightness is above the predetermined value (NO), the methodology returns a value indicating that the brightness is acceptable at 660.

FIG. 7 illustrates a methodology 700 for estimating a contrast parameter. The methodology 700 begins at 710 where it employs as argument a pointer to an image. Two pointers to floating point numbers are also employed as arguments. The first pointer corresponds to a sigma of a smoothing filter (720) and the second pointer corresponds to a contrast threshold (730). At 740, a gradient of the image is estimated at each pixel. Then, at 750, average and maximum values of the gradient are computed. These average and maximum values are employed to estimate both sigma and the contrast threshold at 760. If no smoothing is needed, then sigma is set to 0 (770).

It is to be appreciated that brightness and contrast are only examples of parameters that can be estimated and utilized in an object recognition process. Other types of statistics can also be computed over the image and the results utilized for parameter estimation.

Figure 8:
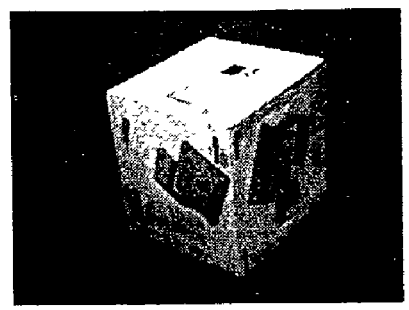
FIG. 8 illustrates an input image employed for image enhancement in accordance with an aspect of the present invention.
Figure 9:
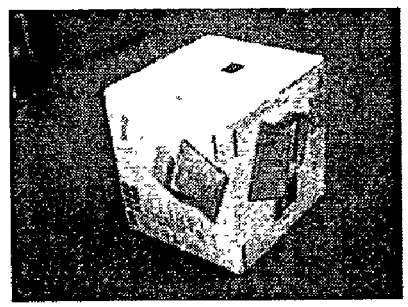
FIG. 9 illustrates the input image of FIG. 8 wherein the image is brightened in accordance with an aspect of the present invention.
Figure 10:
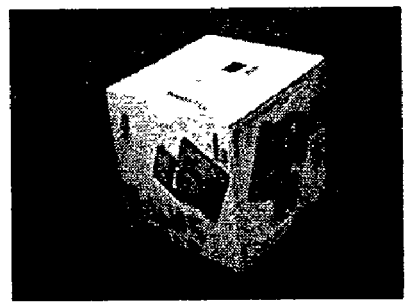
FIG. 10 illustrates the input image of FIG. 8 wherein the image is smoothed in accordance with an aspect of the present invention.

Turning now to FIG. 8, image enhancement is depicted in accordance with an aspect of the present invention. A plurality of types of image enhancement is possible. For example, the system can brighten dark areas, as illustrated in FIG. 9 and/or smooth out noise, such as graininess, as illustrated in FIG. 10. Brightening can be accomplished by stretching contrast in a dark region and compressing the contrast in brighter regions. There are several known ways of accomplishing this objective. For example, if v is the value of a pixel, it is replaced by $\sqrt{(255*v)}$. The values are generally in 8 bit color, such as, 0–255 range byte values. The transformation keeps extreme values (e.g., 0 and 255) unchanged and increments a midrange value from 128 to 181. Smoothing, if necessary, is performed with a Gaussian filter employing a sigma value estimated during parameter estimation. When sigma is large, a very smooth regression surface is achieved. More elaborate rules can also be utilized; for example, directional smoothing. Directional smoothing of boundary pixels tend to preserve the integrity of edges while reducing edge artifacts such as ringing and/or staircasing.

Figure 11:
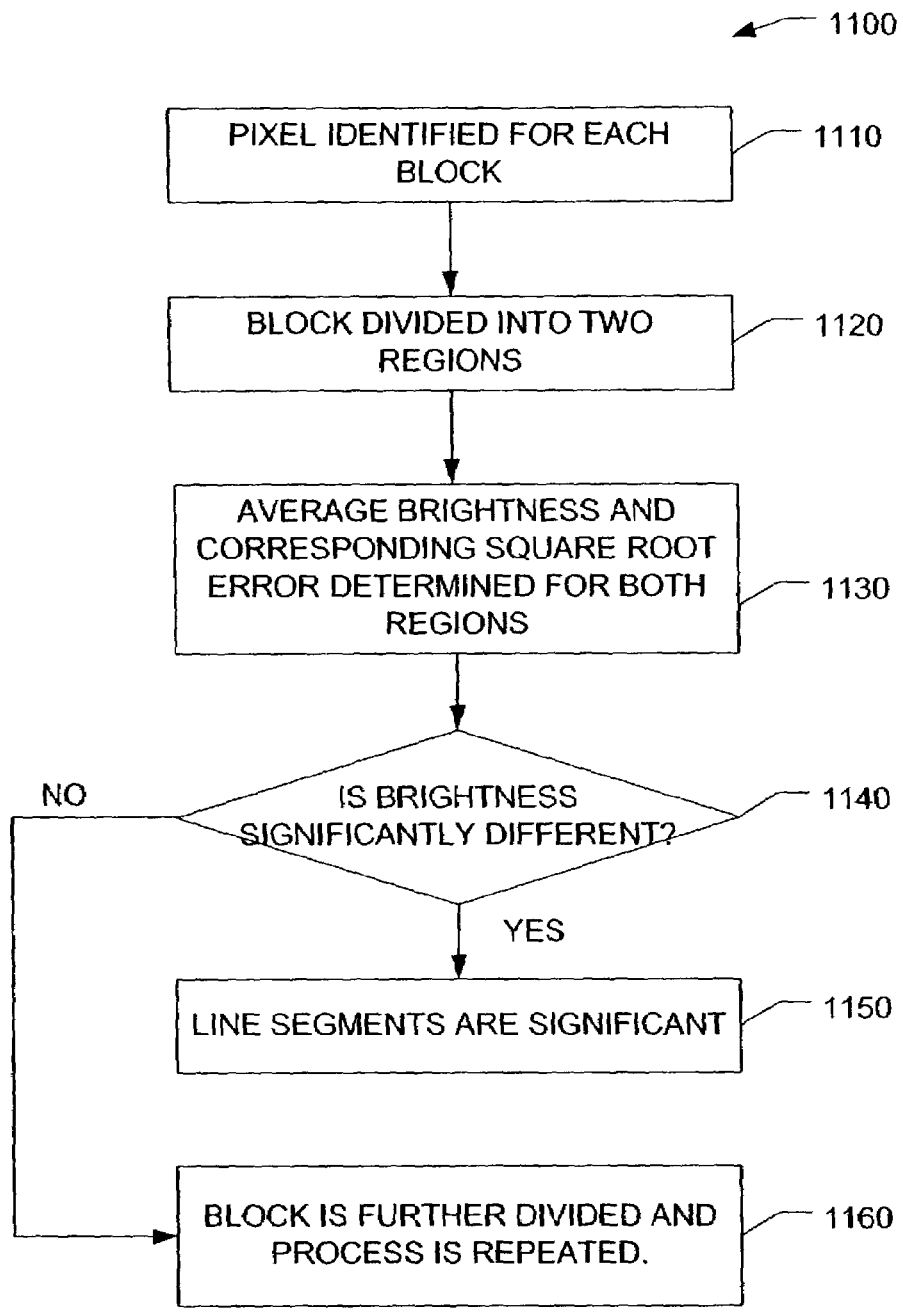
FIG. 11 illustrates a methodology of detecting line segments in accordance with an aspect of the present invention.

FIG. 11 illustrates a methodology of detecting line segments. Line segments are detected over small blocks of the image rather then employing conventional edge detection. The methodology begins at 1110, where a pixel P is identified for each block where the image gradient achieves a maximum value. At 1120, the block is divided in two regions by a line perpendicular to a direction of the gradient and passing through P. Then, at 1130, for each region, an average brightness is estimated and a corresponding square root average error. If the errors of both regions are within a predetermined threshold (e.g., preset parameter) and the average brightness values of both regions are found. At 1140, is it determined whether the average brightness values are significantly different. Significantly different is generally greater than the contrast threshold found in the parameter estimation. If the average brightness values are significantly different (YES), the methodology proceeds to 1150 where the line segments are accepted as significant. However, if the average brightness values are not significantly different (NO), the methodology proceeds to 1160 where the block is subdivided into four substantially equal blocks and the process is repeated until a line segment or the block becomes too small. For instance, the subdivision may be attempted only once. Accordingly, gaps may be left in corners of the reconstructed image, but, as FIG. 4 exemplifies, this is not a serious problem.

One can achieve more accurate line detection by using methods that are more computationally demanding, for example Hueckel's edge/line detector. The Heuckel method employs a kernel h(k, l) that depends on six parameters plus a size of a circular domain D. Edge and line detection is achieved by determining for each position (i, j), values of the six parameters that minimize an integral square error between a brightness function $f(i+k, j+l)$ and h(k, l) over the disc D. The computational requirements of Hueckel's operator are higher than the method described above because the computation must be repeated at every pixel of the image. Several other methods are also possible. For example, the Hueckel kernel could be applied only to the pixel with maximum gradient at each block.

It is possible to speed up the processes by performing the image enhancement and line segment detection on a sub-sampled version of an image, rather than on the original image. The line segments found in this way are scaled back to the original dimensions. In principle, sub-sampling by a factor N should reduce the processing time by N2, however this does not happen because the resulting image is "denser" and there is more processing per pixel.

Figure 12:
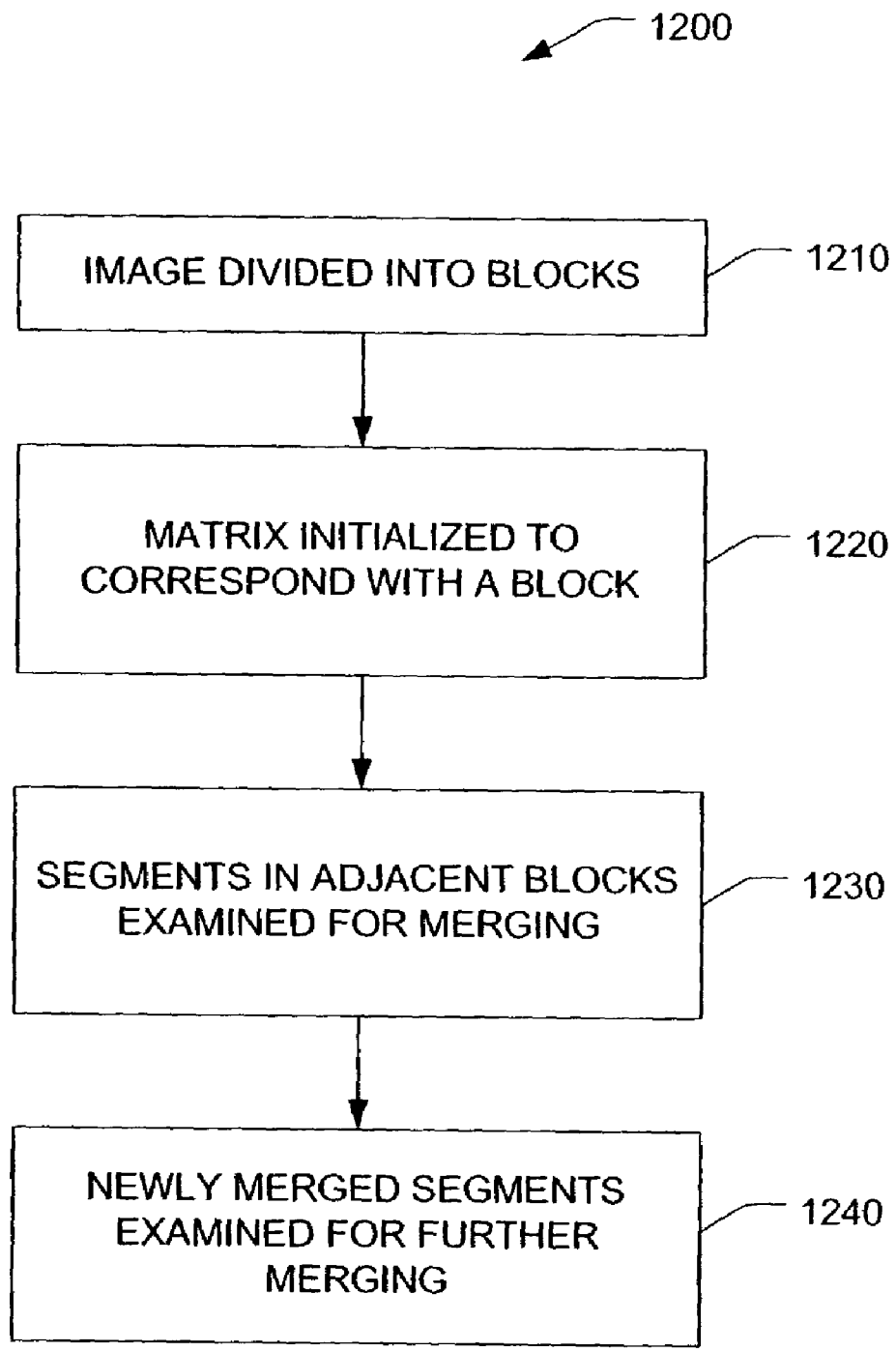
FIG. 12 illustrates a methodology for aggregating line segments in accordance with an aspect of the present invention.

After the line segments have been detected, each line segment is associated with the corresponding block that the segment was extracted from. The association facilitates determining a location of the line segment and an approximate distance between the segments. FIG. 12 illustrates a methodology 1200 for aggregating line segments. The methodology 1200 begins at 1210, where the image is divided into small square blocks, similar to the division made in the line segment detection process described above. At 1220, a matrix is initialized such that each element of the matrix corresponds to a block in the image. The matrix contains indices to the line segments whose end points fall inside the block. At 1230, segments in adjacent blocks, which are defined by a distance of end points in a number of blocks, are examined for merging. The slope of the segments determines whether a merger attempt will be made. The matrix is updated every time two segments are merged so that the newly merged segment can be examined for further merge (1240). Long line segments are favored by giving the segments a higher distance threshold if the difference between the long line segment slopes is small. The complexity of the algorithm o(n), where n is the number of line segments.

A more aggressive algorithm can examine all possible pairs of segments for merging. The slope of the segments and the distance (the closest of the 4 possible combinations of the 4 end points, in pixels) together determines whether or not the merge should be applied. The complexity of this method is o($n^2$).

Figure 13:
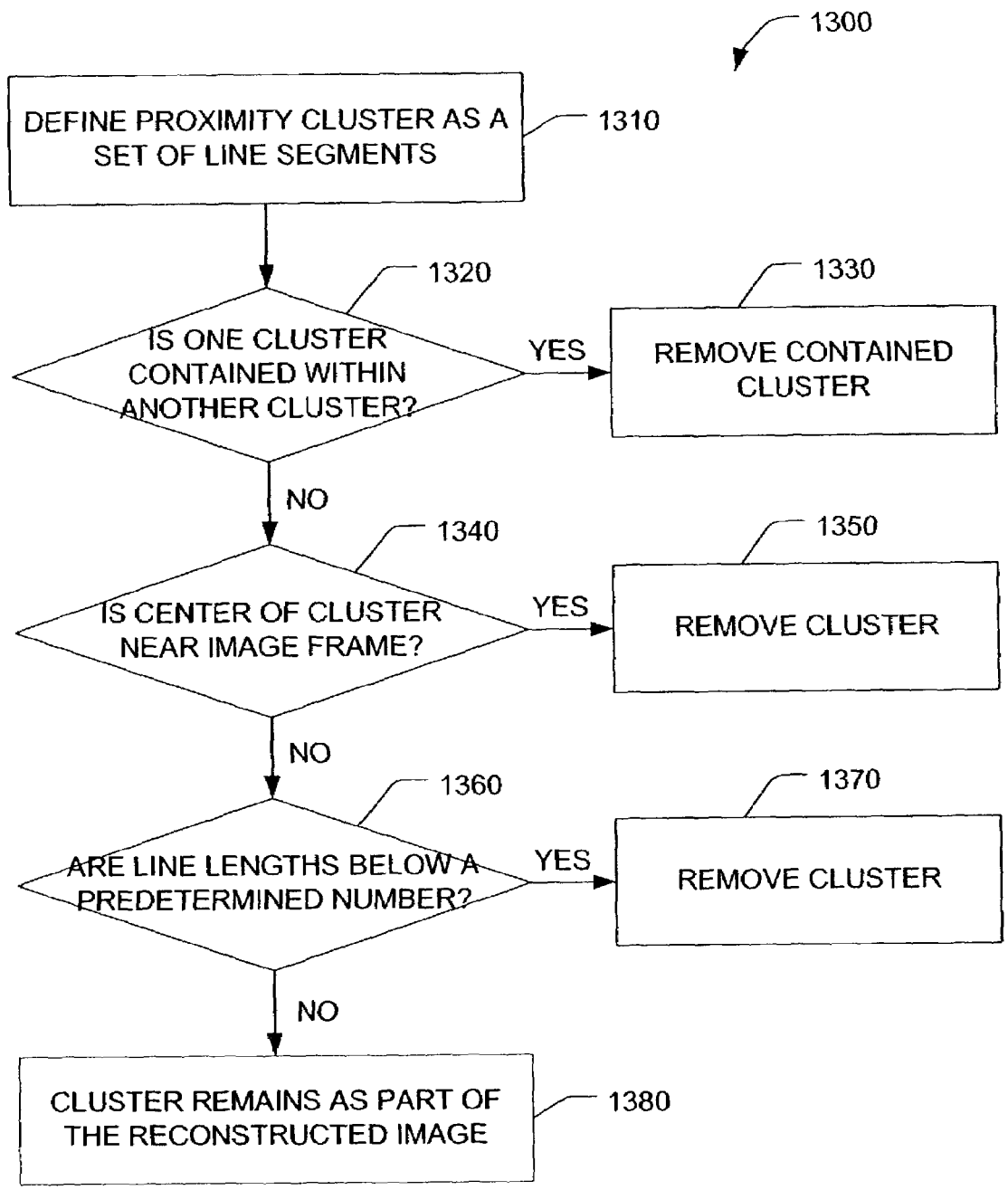
FIG. 13 illustrates a methodology for detecting proximity clusters in accordance with an aspect of the present invention.
Figure 14:
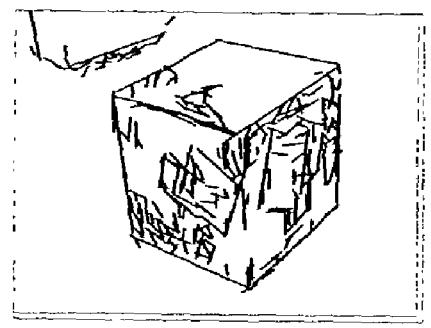
FIG. 14 illustrates a cluster which corresponds to a single object in accordance with an aspect of the present invention.
Figure 15:
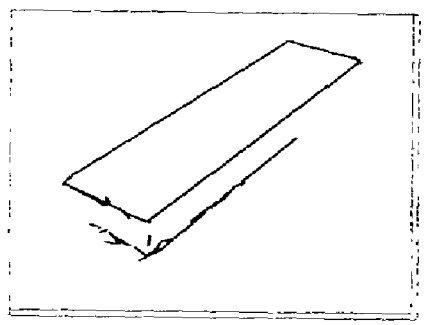
FIG. 15 illustrates an object having more than one cluster in accordance with an aspect of the present invention.
Figure 16:
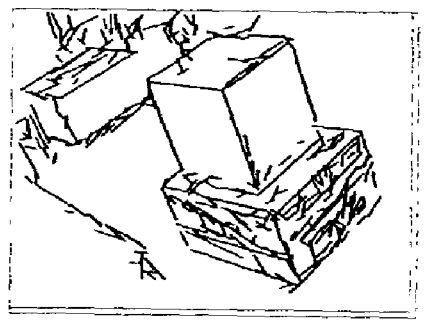
FIG. 16 illustrates a cluster corresponding to a plurality of objects in accordance with an aspect of the present invention.

The general concept of topological or geometric clustering can be used to locate objects by attempting to identify objects and with such clusters. FIG. 13 depicts a possible implementation of this concept. Turning now to FIG. 13, a methodology for detecting proximity clusters is depicted. At 1310, a proximity cluster is defined as a set of line segments. The definition includes a properly that for each line segment S in the set, there exists at least another segment T with a property that S and T have at least a pair of endpoints near each other or one of the endpoints lies close to the other segment. Ideally a cluster should correspond to a single object (FIG. 14). However, in practice, this is not always the case. If parts of an object have low contrast with their surroundings an object may have more than one cluster (FIG. 15). Conversely, if two or more objects are close to each other a single cluster may correspond to the two or more objects (FIG. 16).

As the above examples illustrate, it is better to have too many clusters rather than too few. For example, if necessary, two clusters can be merged into one. While parameter selection can affect the outcome of this step, capturing images in an uncluttered environment is preferred.

Cluster properties can be employed to filter basic proximity clusters for reducing computation in later processes. At 1320, it is determined whether one cluster is totally contained inside another cluster. If the cluster is contained (YES), the methodology 1300 proceeds to 1330 and the contained cluster is removed since it does not contribute to a convex hull. If the cluster is not contained (NO), the methodology proceeds to 1340. At 1340, it is determined whether a geometric center of the cluster is near the image frame. If the cluster is near the image frame (YES), the cluster is removed at 1350 since it is likely that the cluster represents some surrounding objects other than our main target. If the cluster is not near the image frame (NO), the methodology continues to 1360 where it is determined if both an average length of line segments and a length of the longest line segment of the cluster are below a predetermined number, plus the number of line segments in this cluster is less than another predetermined number. If yes, the cluster is removed since it is very likely to be noise (1370). If no, the cluster remains as part of the reconstructed object image (1380).

A standard algorithm is used to find the convex hull of the lines of a cluster. The convex hull of a set of data points is the smallest subset of points on the periphery of the set which encompasses all of the data points in parameter space. Examples of known algorithms that can be employed to find the convex hull of a set of data points include Incremental, Gift Wrap, Divide and Conquer, and QuickHull. For efficiency, the largest proximity cluster is examined first. If the shape of the convex hull is far from the outline of a rectangular box (or any other shape, such as, a hexagon), then the convex hull of a union of all clusters is computed. As an alternative to identifying an object outline (e.g., convex hull), another approach that may be employed in connection with the subject invention is to locate one surface of an object and then determine the rest of the object makeup via employment of that surface.

Figure 17:
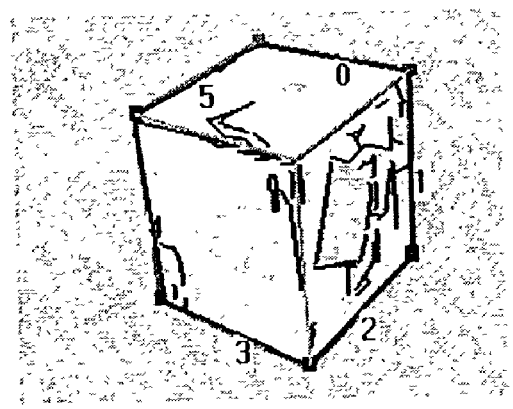
FIG. 17 illustrates a convex hull as an object outline in accordance with an aspect of the present invention.
Figure 18:
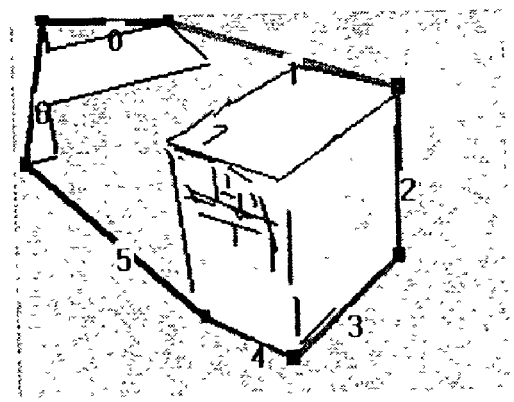
FIG. 18 illustrates a convex hull containing an object outline in accordance with an aspect of the present invention.
Figure 19:
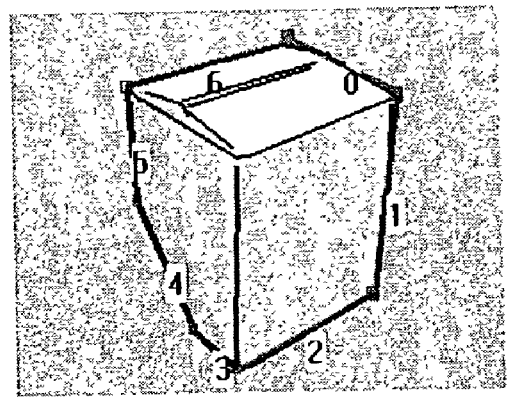
FIG. 19 illustrates a convex hull as a subset of an object outline in accordance with an aspect of the present invention.

FIGS. 17–19 illustrate various relationships between convex hulls and object outlines. Ideally, the convex hull is the object outline, as illustrated in FIG. 17 and the object reconstruction process is complete. However, two types of error can occur. In the first type of error, the convex hull may contain other lines of interest besides the object lines. Thus, the convex hull contains the object outline, as depicted in FIG. 18. In the second type of error, parts of the object outline have not been detected. This can result from low contrast. Accordingly, the convex hull is a subset of the object outline, as depicted in FIG. 19. Moreover, combinations of the two types of errors are also possible.

The process of derivation of the outline from the convex hull is called editing. The key to it is the assignment of confidence levels to the sides of the convex hull. If a side overlaps with a detected line, then it is given high confidence. Low confidence lines are can be discarded, or deleted.

The object outline can be completed as shown below. Consider a Y junction of lines in a middle portion of the object outline. A center point is designated as $P_0$ and three other points are designated as $P_1$, $P_2$, and $P_3$.

Figure 20:
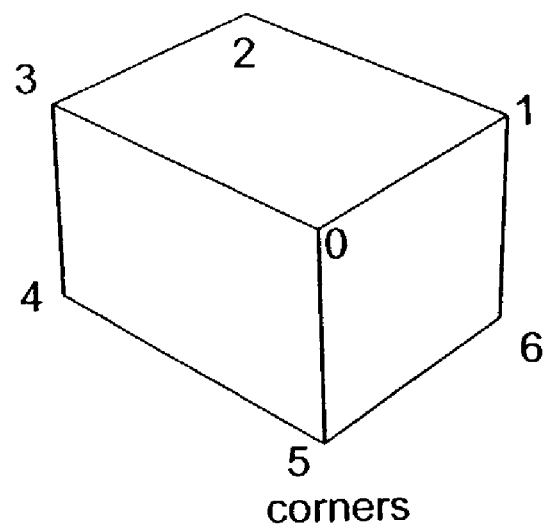
FIG. 20 illustrates a box outline with its corners defined in accordance with an aspect of the present invention.
Figure 21:
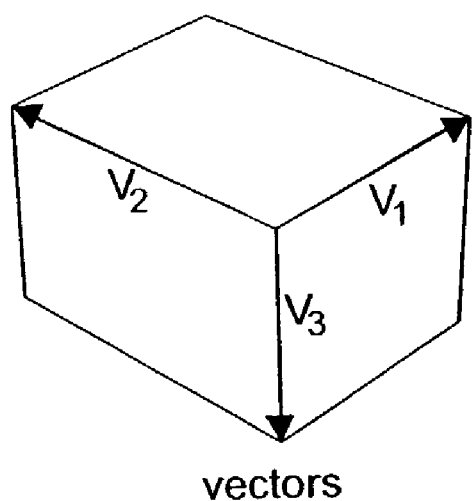
FIG. 21 illustrates a box outline with its edges defined in accordance with an aspect of the present invention.

When the object outline is determined, the object image points are related with a 3D model of the object. Turning now to FIGS. 20 and 21, a box is illustrated having its corners and edges defined in accordance with an aspect of the present invention. It is to be appreciated that any shape object can be employed and is contemplated as falling within the scope of the present invention. In addition to the vectors illustrated in FIGS. 20 and 21, a fourth vector, $V_0$ (not shown), denotes a vector from a camera's projection center to corner 0. The z-axis is defined as the axis that, in a pinhole camera projection system model, passes through the pinhole and is perpendicular to the image plane. The notation $r_n$ is utilized to represent the 2D coordinate of corner n in the 2D projected image. The coordinate center of the image can be obtained in advance through camera calibration. Vectors $v_i$ are defined to be the projection, into the x-y plane, of the corresponding vector represented by the corresponding upper case letter. That is, $$V_i = v_i + z_i \hat{z} \quad v_1 \cdot \hat{z} = 0 \quad i \in [1, 3] \qquad (2)$$

Furthermore, a (projected) substantially instantaneous field-of-view of each pixel is defined as $f$ if the pixels are square; otherwise $f$ is a second-rank matrix. Accordingly, the following equation set is provided:

$$\begin{bmatrix} 1 & 0 & 0 & 0 & -fr_0 & 0 & 0 & 0 \\ 1 & 1 & 0 & 0 & -fr_1 & -fr_1 & 0 & 0 \\ 1 & 1 & 1 & 0 & -fr_2 & -fr_2 & -fr_2 & 0 \\ 1 & 0 & 1 & 0 & -fr_3 & 0 & -fr_3 & 0 \\ 1 & 0 & 1 & 1 & -fr_4 & 0 & -fr_4 & -fr_4 \\ 1 & 0 & 1 & 1 & -fr_5 & 0 & 0 & -fr_5 \\ 1 & 1 & 0 & 1 & -fr_6 & -fr_6 & 0 & -fr_6 \end{bmatrix} \begin{bmatrix} v_0 \\ v_1 \\ v_2 \\ v_3 \\ z_0 \\ z_1 \\ z_2 \\ z_3 \end{bmatrix} = 0 \qquad (3)$$

The linear equation set (3) is substantially simultaneously under-constrained and over-constrained. It is under-constrained because there are no constant terms. The right side is simply 0. Thus, the scale of all the dimensions must be obtained from extra information. The equation set is also over-constrained, as there are 12 scalar unknowns, and yet 14 scalar equations, before adding the additional condition that will determine the scaling. If there is no noise in the input data, the equation set should be self-consistent. The three over-constraints can then be understood as conditions requiring three sets of parallel box edges be mapped into three sets of lines in the image that verge to three vanishing points. When noise is present, the over-constraints point out conflicts in the input data. The conflicts can be resolved through a least-squared method, as will be shown below.

When utilizing a box as an image, the box sides are generally perpendicular to each other. That is, $V_1 \cdot V_2 = 0$ $V_2 \cdot V_3 = 0$ $V_3 \cdot V_1 = 0$ \qquad (4)

Or similarly, $$v_1 \cdot v_2 + z_1 z_2 = 0$$

$$v_2 \cdot v_3 + z_2 z_3 = 0$$

$$v_3 \cdot v_1 + z_3 z_1 = 0 \quad (5)$$

equation set (3) can be simplified by removing the multiplier $f$. Removing $f$ can be achieved in at least three ways: by dividing the multiplier into the vector variables, by multiplying the multiplier into the scalar variables, or by multiplying the multiplier into the image coordinates. Employing the third approach, for example, effectively converts the corner coordinates from pixel units to (projected) angular units (in radians):

$$a_i = f r_i$$

$$_1 i \in [0.6] \quad (6)$$

Thus equation set (3) is simplified into $$\begin{bmatrix} 1 & 0 & 0 & 0 & -\alpha_0 & 0 & 0 & 0 \\ 1 & 1 & 0 & 0 & -\alpha_1 & -\alpha_1 & 0 & 0 \\ 1 & 1 & 1 & 0 & -\alpha_2 & -\alpha_2 & -\alpha_3 & 0 \\ 1 & 0 & 1 & 0 & -\alpha_3 & 0 & -\alpha_3 & 0 \\ 1 & 0 & 1 & 1 & -\alpha_4 & 0 & -\alpha_4 & -\alpha_4 \\ 1 & 0 & 1 & 1 & -\alpha_5 & 0 & 0 & -\alpha_5 \\ 1 & 1 & 0 & 1 & -\alpha_6 & -\alpha_6 & 0 & -\alpha_6 \end{bmatrix} \begin{bmatrix} v_0 \\ v_1 \\ v_2 \\ v_3 \\ z_0 \\ z_1 \\ z_2 \\ z_3 \end{bmatrix} = 0 \quad (7)$$

The problem has many more constraints than unknowns. A plurality of solutions, including an orthographic solution, a linear solution, a combination solution, an iterative solution, and an unbiased iterative solution, can be employed to solve the equation. Performances for the aforementioned solutions are compared below, utilizing sample images, and their respective efficiencies.

In the orthographic solution, the foreshortening is ignored and the image is viewed as a scaled orthographic projection of the box. This has the effect of assuming, in equation (3), or, similarly, in equation (7):

$$z_i = \begin{cases} 1 & i = 0 \\ 0 & i \neq 0 \end{cases} \quad (8)$$

and ignoring the contribution of corners 2, 4, and 6. This yields:

$$v_0 = \alpha_0 z_0$$

$$v_1 = (\alpha_1 - \alpha_0) z_0$$

$$v_2 = (\alpha_3 - \alpha_0) z_0$$

$$v_3 = (\alpha_5 - \alpha_0) z_0 \quad (9)$$

Using equation set (5), an explicit analytical solution is found in several forms, such as:

$$z_1 = \sqrt{\frac{(v_1 \cdot v_2)(v_3 \cdot v_1)}{(v_2 \cdot v_3)}}$$

$$z_2 = -\frac{v_1 \cdot v_2}{z_1}$$

$$z_3 = -\frac{v_3 \cdot v_1}{z_1}$$

Accordingly, the orthographic solution is more accurate when there is no significant foreshortening. However, if only relative dimensions are sought, the orthographic method could give seemingly more precise answers despite a significant foreshortening, as long as the foreshortening is comparable in all three dimensions.

In the linear solution, each of the linear equations in equation (3) can be interpreted as a consistency check between the two-dimensional positions of a corner point, which is a linear combination of $v_i$, and the projected version using the image coordinates, which is a linear combination of $r_i$, multiplied by the estimated z-coordinate of the corner point. Therefore, the error of the equation is the two-dimensional delta of the two estimates, in the x-y plane at this estimated z-coordinate. If one scalar is excluded from the set of variables for the under-constrained condition as have been illustrated in the previous section, equation (3) can be rewritten as:

$$\square \begin{bmatrix} 1 & 0 & 0 & 0 & 0 & 0 & 0 \\ 1 & 1 & 0 & 0 & -\alpha_1 & 0 & 0 \\ 1 & 1 & 1 & 0 & -\alpha_2 & -\alpha_2 & 0 \\ 1 & 0 & 1 & 0 & 0 & -\alpha_3 & 0 \\ 1 & 0 & 1 & 1 & 0 & -\alpha_4 & -\alpha_4 \\ 1 & 0 & 0 & 1 & 0 & 0 & -\alpha_5 \\ 1 & 1 & 0 & 1 & -\alpha_6 & 0 & -\alpha_6 \end{bmatrix} \begin{bmatrix} v_0 \\ v_1 \\ v_2 \\ v_3 \\ z_1 \\ z_2 \\ z_3 \end{bmatrix} + \begin{bmatrix} -\alpha_0 \\ -\alpha_1 \\ -\alpha_2 \\ -\alpha_3 \\ -\alpha_4 \\ -\alpha_5 \\ -\alpha_6 \end{bmatrix} z_0 \quad (11)$$

The error vector is then defined as:

$$E = Nu + K z_0 \quad (12)$$

A least-squared fit can be used to minimize $E^2$. That is, a solution is desired where:

$$\delta E^2 = 0 \quad (13)$$

which leads to:

$$N^T (Nu + K z_0) = 0 \quad (14)$$

and if expanded:

$$\begin{bmatrix} 7 & 3 & 3 & 3 & -\sum_{i=6,1,2}\alpha_i & -\sum_{i=2,3,4}\alpha_i & -\sum_{i=4,5,6}\alpha_i \\ 3 & 3 & 1 & 1 & -\sum_{i=6,1,2}\alpha_i & -\alpha_2 & -\alpha_6 \\ 3 & 1 & 3 & 1 & -\alpha_2 & -\sum_{i=2,3,4}\alpha_i & -\alpha_4 \\ 3 & 1 & 1 & 3 & -\alpha_6 & -\alpha_4 & -\sum_{i=4,5,6}\alpha_i \\ -\sum_{i=6,1,2}\alpha_i & -\sum_{i=6,1,2}\alpha_i & -\alpha_2 & -\alpha_6 & \sum_{i=6,1,2}\alpha_i^2 & \alpha_2^2 & \alpha_6^2 \\ -\sum_{i=2,3,4}\alpha_i & -\alpha_2 & -\sum_{i=2,3,4}\alpha_i & -\alpha_4 & \alpha_2^2 & \sum_{i=2,3,4}\alpha_i^2 & \alpha_4^2 \\ -\sum_{i=4,5,6}\alpha_i & -\alpha_6 & -\alpha_4 & -\sum_{i=4,5,6}\alpha_i & \alpha_6^2 & \alpha_4^2 & \sum_{i=4,5,6}\alpha_i^2 \end{bmatrix} u = \begin{bmatrix} \sum_{i=0}^{6}\alpha_i \\ \sum_{i=6,1,2}\alpha_i \\ \sum_{i=2,3,4}\alpha_i \\ \sum_{i=4,5,6}\alpha_i \\ -\sum_{i=6,1,2}\alpha_i^2 \\ -\sum_{i=2,3,4}\alpha_i^2 \\ -\sum_{i=4,5,6}\alpha_i^2 \end{bmatrix} z_0 \quad (15)$$

When the vectors in a lower left portion of the matrix in (15) are multiplied with the two-dimensional variables $v_i$, the multiply implied is dot multiply. In other words, when the matrix is processed numerically, these aforementioned vectors are implicitly transposed. Similarly, the integers in the top-left portion of the matrix need to be multiplied by second-rank unit matrices when the vectors are flattened for numerical processing.

The error measure in (12) is biased. The different x-y planes used in the measure means that the corners with larger z-distances are emphasized. The least-squared optimization is less biased when the box's depth (in the distance of the optical axis, and excluding the corner invisible in the two-dimensional image) is relatively small compared to its distance from the camera.

As a summary, the orthographic solution does not make use of all of the available data points, and has the problem that the model itself has limited accuracy when significant foreshortening exists. The linear solution makes use of all input points, but ignores the orthogonality constraints. Thus, by employing a combined solution, the strengths of the orthographic solution and the linear solution can reduce the estimation error.

In (15) the x and y components are more solidly based on the measured quantities, while the z components are all inferred from evidence of foreshortening. Thus, the z components tend to contain the most inaccuracies. On the other hand, equations (10) are valid for perspective as well as orthographic projections, as they are derived from (5) directly. Therefore, one can use (10) to recreate the z components of the vectors, using the results of (15) for the x and y components.

In the iterative solution, when the orthogonality constraints in (5) are added to equation (7), the number of free variables is reduced by another 3. Thus a least-squared approach similar to that above but with three less scalar variables becomes obvious.

Rewriting (7) as:

$$0 = Mv + Jz$$

$$0 = \begin{bmatrix} 1 & 0 & 0 & 0 \\ 1 & 1 & 0 & 0 \\ 1 & 1 & 1 & 0 \\ 1 & 0 & 1 & 0 \\ 1 & 0 & 1 & 1 \\ 1 & 0 & 0 & 1 \\ 1 & 1 & 0 & 1 \end{bmatrix} \begin{bmatrix} v_0 \\ v_1 \\ v_2 \\ v_3 \end{bmatrix} + \begin{bmatrix} -\alpha_0 & 0 & 0 & 0 \\ -\alpha_1 & -\alpha_1 & 0 & 0 \\ -\alpha_2 & -\alpha_2 & -\alpha_2 & 0 \\ -\alpha_3 & 0 & -\alpha_3 & 0 \\ -\alpha_4 & 0 & -\alpha_4 & -\alpha_4 \\ -\alpha_5 & 0 & 0 & -\alpha_5 \\ -\alpha_6 & -\alpha_6 & 0 & -\alpha_6 \end{bmatrix} \begin{bmatrix} z_0 \\ z_1 \\ z_2 \\ z_3 \end{bmatrix} \quad (16)$$

The least-squared solution, similar to (14), is $$M^T(Mv+Jz)=0 \quad (17)$$

Expanding:

$$\begin{bmatrix} 7 & 3 & 3 & 3 \\ 3 & 3 & 1 & 1 \\ 3 & 1 & 3 & 1 \\ 3 & 1 & 1 & 3 \end{bmatrix} v = \begin{bmatrix} \sum_{i=0}^{6}\alpha_i & \sum_{i=6,1,2}\alpha_i & \sum_{i=2,3,4}\alpha_i & \sum_{i=4,5,6}\alpha_i \\ \sum_{i=6,1,2}\alpha_i & \sum_{i=6,1,2}\alpha_i & \alpha_2 & \alpha_6 \\ \sum_{i=2,3,4}\alpha_i & \alpha_2 & \sum_{i=2,3,4}\alpha_i & \alpha_4 \\ \sum_{i=4,5,6}\alpha_i & \alpha_6 & \alpha_4 & \sum_{i=4,5,6}\alpha_i \end{bmatrix} z \quad (18)$$

or, $$v = \frac{1}{8}\begin{bmatrix} 5 & -3 & -3 & -3 \\ -3 & 5 & 1 & 1 \\ -3 & 1 & 5 & 1 \\ -3 & 1 & 1 & 5 \end{bmatrix} \begin{bmatrix} \sum_{i=0}^{6}\alpha_i & \sum_{i=6,1,2}\alpha_i & \sum_{i=2,3,4}\alpha_i & \sum_{i=4,5,6}\alpha_i \\ \sum_{i=6,1,2}\alpha_i & \sum_{i=6,1,2}\alpha_i & \alpha_2 & \alpha_6 \\ \sum_{i=2,3,4}\alpha_i & \alpha_2 & \sum_{i=2,3,4}\alpha_i & \alpha_4 \\ \sum_{i=4,5,6}\alpha_i & \alpha_6 & \alpha_4 & \sum_{i=4,5,6}\alpha_i \end{bmatrix} z \quad (19)$$

The iterative approach begins from the orthographic solution, then iterates between equation (19) and equation (10), until z converges. The calculations may be simplified slightly by noticing that $v_0$ does not change.

Note also that due to the significant number of over-constraints, box's relative dimensions can be solved when given as few as four corner points, as long as these four points are not on the same side of the box. The equations (16)–(19), however, need to be adjusted accordingly.

Numerical accuracies of the aforementioned solutions are discussed below. Black-and-white pictures, at VGA resolution, were taken with a scanner, which contains a CCD camera with $f=9.22\times10^{-4}$ (radian/pixel). The value $z_0$ and the box dimensions were measured manually. The corner coordinates in the image were also identified and measured manually. Two boxes of different sizes were utilized for the experiment. The results of the different algorithms are given in Table 1, below. For the iterative approach, four iterations were used each time. The camera has visible barrel distortion, which is not corrected for. The composite performance measure is defined as the average of the absolute errors in three dimensions:

$$\Delta = \frac{1}{3}\sum_{i=1}^{3}||\hat{V}_i| - |V_i|| \qquad (20)$$

where $V_t$ is the estimated value of the corresponding vector without the caret.

TABLE 1

Box dimensions - numerical comparison of four different algorithms
(all lengths are in inches)

|  | Box 1 | | | | Box 2 | | | |
| --- | --- | --- | --- | --- | --- | --- | --- | --- |
|  | $V_1$ | $V_2$ | $V_3$ | $\Delta$ | $V_1$ | $V_2$ | $V_3$ | $\Delta$ |
| Actual | 8.50 | 11.60 | 5.00 | — | 15.60 | 12.45 | 3.15 | — |
| Orthographic | 6.80 | 9.17 | 4.47 | 1.56 | 12.27 | 9.90 | 2.92 | 2.04 |
| Linear | 8.39 | 11.55 | 5.09 | 0.09 | 15.17 | 11.89 | 3.01 | 0.38 |
| Combination | 8.43 | 11.82 | 5.08 | 0.12 | 15.51 | 12.09 | 3.09 | 0.17 |
| Iterative | 8.50 | 11.93 | 5.12 | 0.15 | 15.76 | 12.23 | 3.15 | 0.13 |

According to the table above, the orthographic algorithm tends to underestimate the box dimensions, especially those with significant foreshortening, as expected. It appears that the combination and iterative algorithms achieved the most accurate estimates. However, the iterative algorithm is simpler and probably faster than the combination algorithm.

Theoretically calculating the estimation error of each algorithm, as discussed above, is difficult due to a relatively complex relationship between the input and output values. The calculations can be done more easily through numerical methods, however, using perturbation on the input values to get the Jacobian partial derivatives. The process is relatively quick for the iterative algorithm because the unperturbed result can be used as initial values, and the iteration can converge after one cycle.

Scale factor estimation can be performed independently of the rest of the processing. To estimate the scale factor, two laser beams (e.g., parallel) can be employed to create two bright spots on an object. The laser beams are substantially symmetric relative to an image center of the object. The image center can be a geometric center of an image plane. A distance between the two bright spots is determined and utilized to calculate the scale factor. When the spot is located in the image, a horizontal distance from the image center is known. Then, employing the horizontal distance and the distance between the two laser beams, the distance between the image of the laser spot on the object and the center of the image can be determined. Accordingly, means to convert pixel distances to absolute units (e.g., inches) are provided.

Alternatively, the scale of the object can be estimated by employing a parallax of a single laser beam. Similar to the two laser beam process, the single beam obtains range information from the image. Mathematical models of both scale determination techniques follow.

When scaling with a single laser beam, a line representing the beam can be described as a series of points (g,z), related as:

$$g = g_0 + \beta_g z \qquad (21)$$

where $g_0$ and $\beta_g$ are 2D vector parameters used to define the line. At a point where the laser line intersects the object under investigation, a bright spot can be located in the image. The equation to relate this intersection point's location in the image, $\alpha_g$, with its z distance, $z_g$, is akin to those in (7):

$$g - \alpha_g z_g = 0 \qquad (22)$$

Combining (21) and (22), we get $$(\alpha_g - \beta_g) z_g = g_0 \qquad (23)$$

equation (23) indicates that the two dimensions of the measurement should be consistent in such a way that the trajectory of the laser spot in the image plane is a straight line. Measurement error can thus be reduced by projecting the vectors onto that line, which is obtainable in the calibration process. The range of the laser intersection spot is:

$$z_g = \frac{g_0^2}{(\alpha_g - \beta_g) \cdot g_0} \qquad (24)$$

The parameters in (23) or (24) are obtained through calibration.

The laser spot is observed within one of the surfaces that has been previously resolved. For example, assuming the surface is flat; the z-distance is known to vary linearly with its respective x-y coordinate:

$$z = z_p + T \cdot v \qquad (25)$$

where $z_p$ and T are a constant scalar and a two-dimensional constant vector used to describe the plane. In addition, the projection model, which is substantially similar to equation (7), is:

$$v = \alpha z \qquad (26)$$

Combining (25) and (26), results in:

$$\frac{z_p}{z} + T \cdot \alpha = 1 \qquad (27)$$

The constants can be obtained by the knowledge of the four corners of the side of the box that contains the laser spot. Again the problem is over-constrained; however, because of the previous algorithm solutions, the equations should be consistent. In other words, in practice any three of the four corners can be utilized. Thus, when three corners are entered into equation (27), a linear set is produced. When the constant vector T is determined, equation (27) can be employed to relate zg and $z_0$, as the laser spot falls on a plane which also contains point $P_0$:

$$z_0 = z_g \frac{1 - T \cdot \alpha_g}{1 - T \cdot \alpha_0} \qquad (28)$$

$$= \frac{1 - T \cdot \alpha_g}{1 - T \cdot \alpha_0} \cdot \frac{g_0^2}{(\alpha_g - \beta_g) \cdot g_0}$$

$$= \frac{G^2}{(\alpha_g - \beta_g) \cdot G} \text{ where,}$$

$$G = g_0 \frac{1 - T \cdot \alpha_g}{1 - T \cdot \alpha_0} \qquad (29)$$

In general, scaling with two lasers gives more accurate ranging results, as the system is over-determined. With two lasers, the redundancy generally provides a more reliable system since one laser suffices in providing the range. There is no requirement for the two lasers to be parallel to each other; however it is advantageous that two laser spots are uniquely identifiable. The least-squared result is derived for obtaining a best estimate for $z_0$, given a random noise in the locations of the two laser spots.

Equation (23) can be used to give an estimated value of the laser spot, knowing $z_0$. The two laser spots are presumed to be subject to the same random noise. The error can be written as:

$$\varepsilon^2 = \left(\alpha_g - \beta_g - \frac{g_0}{z_g}\right)^2 + \left(\alpha_h - \beta_h - \frac{h_0}{z_h}\right)^2 \qquad (30)$$

where the two laser beams are denoted with the letters g and h, respectively. It is further assumed that the two laser spots are observed on two planes forming sides of the box, P1 and P2, respectively, with the understanding that they could also be the same plane, or side of the box, without jeopardizing the derivation. From equation (28):

$$z_g = z_0 \frac{1 - T_1 \cdot \alpha_0}{1 - T_1 \cdot \alpha_g} \qquad (31)$$

$$z_h = z_0 \frac{1 - T_2 \cdot \alpha_0}{1 - T_2 \cdot \alpha_h}$$

Then, substituting equation (31) into equation (30), and taking $$\frac{d\varepsilon^2}{dz_0} = 0 \qquad (32)$$

the following results:

$$\left(\alpha_g - \beta_g - \frac{G}{z_0}\right) \cdot \frac{G}{z_0^2} + \left(\alpha_h - \beta_h - \frac{H}{z_0}\right) \cdot \frac{H}{z_0^2} = 0 \qquad (33)$$

-continued where, $$G = g_0 \frac{1 - T_1 \cdot \alpha_g}{1 - T_1 \cdot \alpha_0} \qquad (34)$$

$$H = h_0 \frac{1 - T_2 \cdot \alpha_h}{1 - T_2 \cdot \alpha_0}$$

Noting that $z_0 \neq 0$:

$$z_0 = \frac{G^2 + H^2}{(\alpha_g - \beta_g) \cdot G + (\alpha_h - \beta_h) \cdot H} \qquad (35)$$

In determining a precision for the single laser system, equation (23) is utilized:

$$d\alpha_g z_g^2 + g_0 dz_g = 0 \qquad (36)$$

$$d\alpha_g z_g^2 + g_0 dz = 0 \qquad (36)$$

Or, $$\frac{dz_g}{z_g} = \frac{z_g}{g_0^2} g_0 \cdot d\alpha_g \qquad (37)$$

Figure 22:
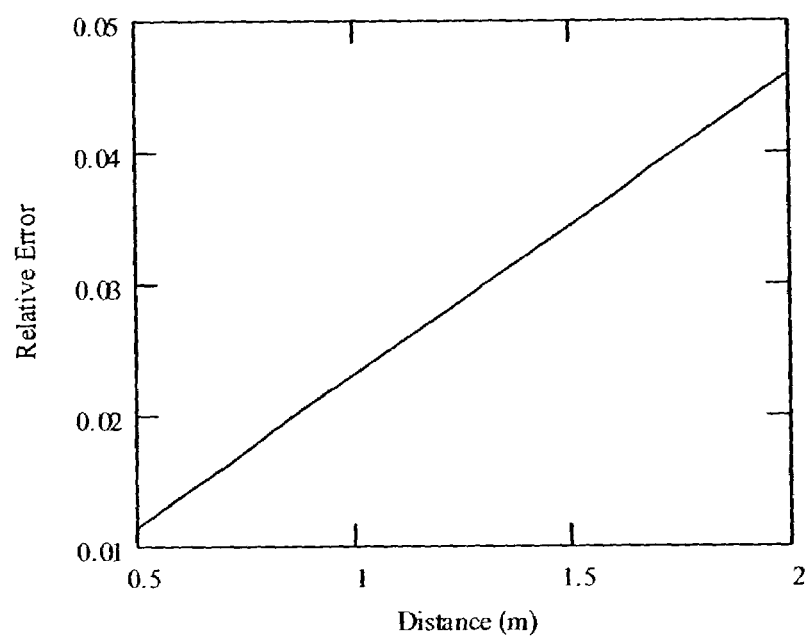
FIG. 22 illustrates a ranging precision estimation in accordance with an aspect of the present invention.

Equation (37) suggests that the relative measurement error is dependent on the offset of the laser from the camera lens, but not on the direction where it is aimed. Moreover, the component of measurement error perpendicular to $g_0$ does not contribute to ranging error. In addition, the further the object is the larger the percentage error. If we assume that the laser spot location error is half a pixel, and that the laser offset is 2 cm, the result is graphed in FIG. 22. A range of 2 meters can be utilized to accommodate most box sizes. With these parameters, it is difficult to get better than 2% precision, not to mention accuracy. For the latter one must consider the calibration errors and the camera's stability in use. Furthermore, the complete dimensioning accuracy relies also on the image correction (for distortion) and image processing accuracy.

Note that equation (37) only gives the precision of $z_g$. However, the precision of $z_0$ is needed. Accordingly, for the latter there is, from equation (28) and equation (23), $$dz_0 = -\frac{z_0 z_g}{g_0^2} g_0 \cdot d\alpha_g - z_g \frac{T \cdot d\alpha_g}{1 - T \cdot \alpha_0} \qquad (38)$$

where the precision of the plane parameter T and that of the corner $\alpha_0$ have been substantially unobserved. The first term in equation (38) is approximately the same as (37), in the general case where $z_0 \approx z_g$. The second term, however, is dependent on an inclination of the box surface that the laser spot is located. The more the box surface is inclined with regard to the z-plane, the larger the error.

In a two laser system, from equation (35):

$$dz_0 = \frac{2z_0}{G^2 + H^2}[G \cdot dG + H \cdot dH] - \qquad (39)$$

-continued $$\frac{z_0^2}{G^2 + H^2}[G \cdot d\alpha_g + H \cdot d\alpha_h + (\alpha_g - \beta_g) \cdot dG + (\alpha_h - \beta_h) \cdot dH]$$

From (30):

$$\alpha_g - \beta_g \approx \frac{g_0}{z_g} \qquad (40)$$

$$\alpha_h - \beta_h \approx \frac{h_0}{z_h}$$

and from (34) and (27):

$$G \approx g_0 \frac{z_0}{z_g} \qquad (41)$$

$$H \approx h_0 \frac{z_0}{z_h}$$

Therefore, $$dz_0 \approx \qquad (42)$$

$$\frac{z_0}{G^2 + H^2}[G \cdot dG + H \cdot dH] - \frac{z_0^2}{G^2 + H^2}[G \cdot d\alpha_g + H \cdot d\alpha_h]$$

In addition, we have, from (34):

$$dG = g_0 \frac{-T_1 \cdot d\alpha_g}{1 - T_1 \cdot \alpha_0} \qquad (43)$$

$$dH = h_0 \frac{-T_2 \cdot d\alpha_h}{1 - T_2 \cdot \alpha_0}$$

Process variations can be made to facilitate speed and accuracy of dimensioning, as well as to make the processing more robust to a wide variety of working environments. Although the present invention has been described as employing laser beams, other laser patterns, such as cross pattern, star pattern, single or multiple lines, single or concentric circles and eclipses, or grids, can also be employed to extract edge information by structured lighting techniques. Multiple images can be taken to analyze and adjust auto exposure such that the laser pattern employed can be accurately identified. Note, that this auto exposure can be different from auto exposure for the image. Alternatively, a movable filter can be utilized to filter out other colors, leaving the laser pattern alone. Multiple views can also be utilized to identify edges of the object and extract distance information.

It is to be appreciated that the solid object reconstruction systems and methods of the subject invention, as described herein, have wide applicability. Solid object reconstruction can be employed in a variety of applications. For example, the present invention can be utilized in a parcel shipping business. The box dimensioning processes can be utilized to gather data on package sizes for volume dependent shipping charge assessment. The box dimensioning processes can also be utilized for preparing shipping vehicles and arranging shipping routes depending on the volume of packages.

Unlike conventional methods, disappearance of vanishing points is not a concern in the present invention, as the present invention generally employs one view of an image having three sides of an object visible. Least-squared methods are employed to reconcile locations of corner points of the object, which is similar to solving for common vanishing points without actually computing the points. The least-squared method is employed in the reconciliation of the input points, rather than requiring calculations of partial derivatives. Moreover, range information is provided through the same image utilized to resolve for the object's relative dimensions. Thus, the present invention is more efficient in design and operation over the conventional systems and/or methods.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An image processing system comprising:
    an image capture component that receives at least one view of a two-dimensional image, the image capture component employing two laser beams to create bright spots on the object to calculate the scale factor;
    an image analyzer that analyzes the captured image, the image analyzer including at least one of a distance analyzer and scaling component employed in connection with generating data for object construction; and
    an object construction component that receives the analyzed image and generates a three-dimensional object relating to the captured two-dimensional image.

2. The system of claim 1 locating edges of an image in connection with locating corners of the image.

3. The image processing system of claim 1, further comprising a data store to store image related data.

4. The image processing system of claim 1, further comprising a processing component that receives the generated three-dimensional object and employs the three-dimensional object in connection with determining measurement of the object.

5. A camera employing the image processing system of claim 1.

6. A portable computing devices employing the image processing system of claim 1.

7. A cellular telephone employing the image processing system of claim 1.

8. An inventory monitoring device employing the image processing system of claim 1.

9. A method for object reconstruction comprising:
    capturing an image, the image being a single two-dimensional view of a solid object;
    employing a subset of total viewable corners of the solid object in connection with the object reconstruction;
    detecting a plurality of line segments of the captured image;
    identifying an outline of the object; and
    forming a three-dimensional model of the object.

10. The method of claim 9, further comprising automatically extracting at least one parameter for at least one of smoothing out noise and enhancing contrast.

11. The method of claim 9, wherein the detecting the plurality of line segments is performed over a plurality of blocks of the image.

12. The method of claim 11, further comprising identifying a pixel for each of the plurality of blocks where an image gradient is at a maximum value and each of the plurality of blocks is divided into two regions by a line perpendicular to the direction of the gradient and passing through the identified pixel.

13. The method of claim 12, further comprising estimating an average brightness and a corresponding square root average error for each of the regions for determining whether a line segment is significant.

14. The method of claim 9, further comprising detecting at least one proximity cluster, the proximity cluster comprising a set of line segments.

15. The method of claim 9, further comprising estimating a convex hull.

16. The method of claim 15, wherein the outline of the object is derived from the convex hull.

17. The method of claim 9, further comprising estimating a dimension for a three dimension rectangular box.

18. The method of claim 9, wherein the object is a three dimension box.

19. The method of claim 18, further comprising employing a least squared method for reconciling locations of corner points of the box.

20. The method of claim 9, further comprising determining parameters for the three-dimensional model via an orthographic solution.

21. The method of claim 9, further comprising determining parameters for the three-dimensional model via a linear solution.

22. The method of claim 9, further comprising determining parameters for the three-dimensional model via a combined orthographic and linear solution.

23. The method of claim 9, further comprising determining parameters for the three-dimensional model via an iterative solution.

24. The method of claim 9, further comprising determining parameters for the three-dimensional model via an unbiased iterative solution.

25. The method of claim 9, further comprising estimating a scale factor between a camera image and the object.

26. The method of claim 25, further comprising employing two laser beams to create bright spots on the object to calculate the scale factor.

27. The method of claim 9 being employed in a parcel slipping business.

28. The method of claim 9 further comprising locating one surface of the solid object and determining object makeup via employment of the one surface.

29. A method for object reconstruction comprising:
    capturing at least two images taken with differing amount of integration time respectively;
    employing a darker image of the at least two images to determine a laser spot and at least one surface of an object under measurement; and
    employing a brighter image of the at least two images to determine another surface of the object.

30. The method of claim 29, wherein the at least two images are taken within a time period less than or equal to 40 ms.

31. A method for object reconstruction comprising:
    capturing an image, the image being a single two-dimensional view of a solid object;
    employing a subset of total viewable corners of the solid object in connection with the object reconstruction;
    creating a sub-sampled version of the image;
    enhancing the sub-sampled version of the image;
    detecting a plurality of line segments of the sub-sampled version of the image, such that the line segments are scaled to original image dimensions;
    aggregating the plurality of line segments of the captured image;
    identifying an outline of the object; and
    forming a three-dimensional model of the object.

32. An image processing system comprising:
    an image capturing means for receiving at least one view of a two-dimensional image, the image capturing means employing two laser beams to create bright spots on the object to calculate the scale factor;
    an image analyzing means for analyzing the captured image, the image analyzer means including at least one of a distance analyzer means and scaling component means employed in connection with generating data for object construction; and
    means for receiving the analyzed image and generating a three-dimensional object relating to the captured two-dimensional image.

33. The system of claim 32, further comprising means for storing image related data and means for processing the image related data.

* * * * *